UNITED STATES PATENT OFFICE.

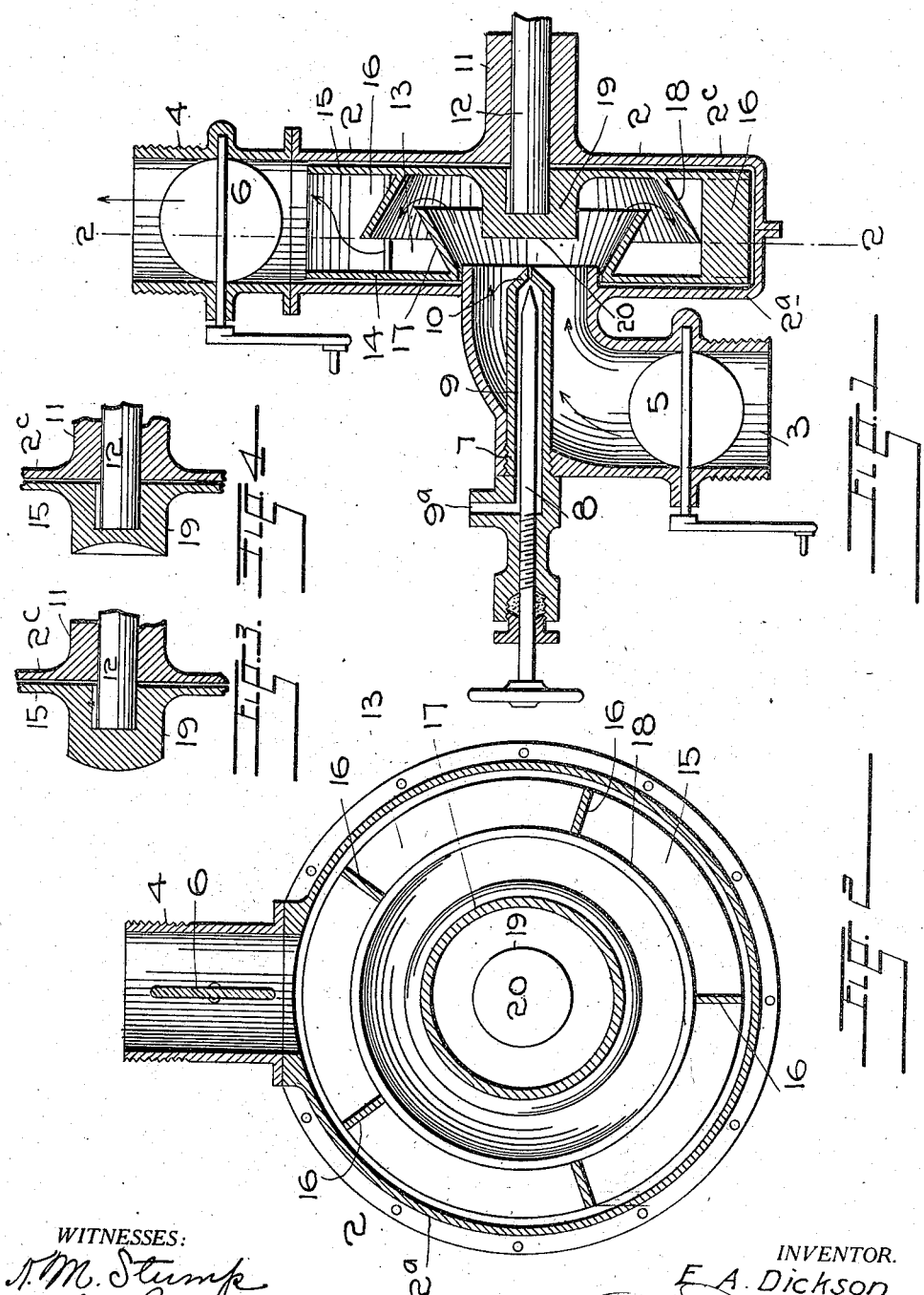

EDGAR A. DICKSON, OF DENVER, COLORADO, ASSIGNOR OF ONE-HALF TO EDWIN W. HURLBUT, OF DENVER, COLORADO.

CARBURETER.

939,481.     Specification of Letters Patent.     Patented Nov. 9, 1909.

Application filed December 21, 1907. Serial No. 407,491.

*To all whom it may concern:*

Be it known that I, EDGAR A. DICKSON, a citizen of the United States of America, residing at Denver, in the county of Denver and State of Colorado, have invented certain new and useful Improvements in Carbureters, of which the following is a specification.

This invention relates to certain novel and useful improvements in carbureters and has for its object to provide a device of the class named in which mechanical means of simple construction are efficiently applied to effect rapid and thorough intermixture of the air and volatile hydro-carbon or of any other fluids introduced into the apparatus.

My invention is especially adapted for use in association with engines and other contrivances which in their operation depend upon the action of carbureted air and it is of peculiar value in connection with the type of motor vehicles whose engines are actuated by the expansive property of the explosive mixture of hydro-carbon and oxygen.

I attain the above object by the mechanism illustrated in the accompanying drawings in the various views of which like parts are similarly designated and in which—

Figure 1— represents a vertical, central section through the apparatus, Fig. 2— a vertical section taken along a line 2—2, Fig. 1, and Figs. 3 and 4, modified forms of the deflective member included in its construction.

Referring to the drawings, let the reference character 2 designate the cylindrical shell or housing, composed of two flanged parts 2ª and 2ᶜ and provided with an inlet pipe 3 which extending downwardly from a central opening in one of the parts, 2ª, of the casing, may be connected with any suitable supply of liquid or gaseous fluid.

An outlet pipe 4 connects with an opening in the upper portion of the casing and the flow of air or other fluid through each of the two pipes is controlled by means of butterfly valves 5 and 6, which are pivotally mounted intermediate their extremities.

Projecting into the cylindrical housing through a threaded aperture in the upper portion of the inlet pipe and substantially in alinement with the former's axis, is an injection tube 7 through which the gasolene or other gaseous fluid used to carburet the air which enters the housing through the pipe 3, is introduced.

A needle valve 8, longitudinally adjustably projecting through the bore 9 of the tube 7, is designed to regulate the flow of fluid which enters the latter by a lateral passage 9ª, through the nozzle 10 at its inner extremity.

Revolubly mounted in a bearing 11 which extends outwardly from and in central relation to the part 2ᶜ of the casing, is a shaft 12 which carries upon its inner extremity a circular member 13 which, occupying the correspondingly formed interior of the housing 2, is composed of two parallel disks 14 and 15, concentrically disposed in relation to the shaft.

The disk 14 which is outermost in relation to the extremity of the shaft 12, has a central, inwardly flaring, conoidal flange or trumpet shaped baffle 17 which surrounds the orifice of the inlet pipe and whose inner portion is encircled by a conical flange or baffle 18 of greater diameter which flares in and outwardly from the second disk 15. Formed or located between said disks 14 and 15 and extending from their circumferences radially inward to the peripheral edge of said conical flange 18, are a plurality of vanes 16. As the disks 14 and 15 are revolved, said vanes blow the carbureted air away from the center and toward the circumference of the housing, and consequently toward the outlet 4. This last named disk is furthermore provided with an inwardly extending central hub 19 into which the extremity of the shaft 12, is secured and whose face 20, extending parallelly to and interjacent the two disks, presents a deflecting surface to the fluid ejected from the nozzle 10 which projecting into the central opening in the disk 14, is opposed to the hub.

In the operation of the device, a rotative movement is imparted to the shaft 12 and the therewith associated wheel 13, by connection of the former with a suitable source of energy and the fluids it is desired to intermix, are introduced into the interior of the casing 2, respectively through the nozzle 10 and the surrounding orifice of the inlet pipe 3, in quantities regulated by the position of the valves 8 and 5. The gaseous fluid ejected from the nozzle 10 impinges upon the surface 20 of the hub 19 which forms part of the revolving member 13, and being deflected, is reduced into a myriad of separated infinitesimal atoms which by the centrifugal force imparted thereto by the rotary movement of the said surface, are infused into the current of air which flows through the interior of the apparatus. The impregnated air, being drawn toward the outlet pipe 4, by the suction derived from the connection of the device with the engine or analogous contrivance and augmented by the action of the vanes 16 on the revolving member, upon the fluid in the housing, is directed to flow in a tortuous course by the overlapping inwardly projecting conoidal flanges or baffle plates 17 and 18, which form part of the revolving element, and is by frictional contact therewith still more thoroughly intermixed with the vaporous substance which was injected thereinto from the nozzle 10, and the two fluids being thus intimately associated, pass through the valve controlled outlet 4 to be conveyed to the contrivance connected therewith.

I wish it understood that, while I have illustrated and described the apparatus in the simplest form now known to me, variations of the form and arrangement of the various parts comprised therein, may be availed of within the spirit of my invention. For example the surfaces of the deflector and the conical baffle plates may be roughened or formed in any manner conducive to effecting a more thorough intermixture of the two fluids; the former may be made convex or concave as is shown in Figs. 3 and 4 of the drawings and the baffle plates may, if necessary, be increased in number.

The various valves included in the device may also be of any suitable construction, those shown in the drawings being preferable on account of their simplicity and as being well adapted to my purpose.

Having thus described my invention what I claim is:—

1. A carbureter, comprising in combination with a circular housing having a central inlet and a peripheral outlet, an injector entering said housing through said inlet, and a rotary mixing member having opposed concentric baffles formed therein adapted to receive fluid elements opposite said inlet and to discharge said elements in a mixed condition through said outlet, said mixing member comprising means for passing the fluid from side to side thereof and means to finally discharge them peripherally.

2. A carbureter, comprising in combination with a circular housing having a central inlet and a peripheral outlet, an injector entering said housing through said inlet, and a rotary mixing member adapted to receive fluid elements opposite said inlet and to discharge said elements in a mixed condition through said outlet, said mixing member comprising opposing disks having intermediate joining vanes and opposingly disposed conoidal flanges.

3. A carbureter comprising in combination with a circular housing having a central inlet and a peripheral outlet, an injector entering said housing through said inlet, and a rotary mixing member adapted to receive fluid elements opposite said inlet and to discharge said elements in a mixed condition to said outlet, said mixing member comprising opposing disks having intermediate joining vanes and opposingly disposed conoidal flanges, said vanes being disposed to cause an outwardly directed draft.

4. A carbureter comprising in combination with a circular housing having a central inlet and a peripheral outlet, an injector entering said housing through said inlet, and a rotary mixing member adapted to receive fluid elements opposite said inlet and to discharge said elements in a mixed condition through said outlet, said mixing member comprising opposed and jointly rotating disks, one of said disks having a central opening located adjacent and concentrically of said inlet and the other a corresponding projection, opposing conoidal flanges formed on said disks and concentric with said projection, and radial blades disposed between said disks and adapted to deflect a draft current outwardly.

5. A carbureter comprising in combination with a circular housing having a central inlet and a peripheral outlet, an injector entering said housing through said inlet, and a rotary mixing member adapted to receive fluid elements opposite said inlet and to discharge said elements in a mixed condition through said outlet, said mixing member comprising opposing concentric elements for passing the fluid from side to side thereof, and means to finally discharge them peripherally, and valves for controlling said inlet and outlet.

6. A carbureter comprising in combination with a circular housing having a central inlet and a peripheral outlet, an injector entering said housing through said inlet, and a rotary mixing member adapted to receive fluid elements opposite said inlet and to discharge said elements in a mixed condition through said outlet, said mixing member comprising opposed and jointly rotating disks, one of said disks having a central opening located opposite said inlet and the other a corresponding projection, said projection forming a deflecting plate opposite said opening, opposing conoidal flanges formed on said disks and concentric with said projection, and radial blades disposed between said disks and adapted to deflect a draft current outwardly.

7. In a carbureter, a housing having a fluid outlet and an inlet having its orifice in a side of said housing, an injector nozzle projecting into the said orifice and a revoluble element within the housing including two connected disks one of which has an opening registering with the orifice, and a baffle plate surrounding the said opening, and the other a deflective surface opposite the said opening and a baffle plate surrounding the first named baffle plate.

8. In a carbureter, a housing having a fluid outlet and an inlet having its orifice in a side of the said housing, an injector nozzle projecting into the said orifice and a revoluble element including a deflective surface opposite the said orifice and the said nozzle, and overlapping baffle plates surrounding the said surface so as to direct deflected fluid in a tortuous course.

9. In a carbureter, a housing having a fluid outlet and an inlet having its orifice in a side of the said housing, an injector nozzle projecting into the said orifice and a revoluble element including a deflective surface opposite the said orifice and the said nozzle, overlapping baffle plates surrounding the said surface so as to direct deflected fluid in a tortuous course, and vanes extending radially from the said surface to effect suction.

In testimony whereof I have affixed my signature in presence of two witnesses.

EDGAR A. DICKSON.

Witnesses:
G. J. ROLLANDET,
E. W. HURLBUT.